of the formulae:

2,933,465

VINYL CHLORIDE RESINS STABILIZED WITH TITANIUM CHELATES

Harold M. Olson, Hudson, Ohio, assignor to The Harshaw Chemical Company, Cleveland, Ohio, a corporation of Ohio No Drawing. Application May 17, 1956
Serial No. 585,378

1 Claim. (Cl. 260—23)

This invention relates to improved plastic compositions and more specifically to stabilization of vinyl chloride plastics. This application is a continuation-in-part of my copending application, Serial No. 365,228, filed June 30, 1953, now U.S. Patent No. 2,777,826.

In the manufacture of plastics containing vinyl chloride resins and plastics containing vinyl chloride along with other vinyl compounds such as vinyl acetate, there are usually incorporated plasticizers, metallic stabilizing compounds dispersed in the composition and additional compounds suitable for further improving the stability of the resin in the plastic against the action of aging and of heat and/or light. Numerous compounds have been used for these latter purposes, such as substituted phenols, esters of salicylic and stearic acids, and organic phosphates and phosphites, to mention only a few which have proved more or less useful.

In the compounding of resins of the type indicated, it is customary to make use of suitable plasticizers, such, for example, as high boiling esters, e.g., dioctyl phthalate, phosphates, polymeric compounds, etc. as well as secondary plasticizers, such as chlorinated paraffins, etc.; metal soaps, such as for example, zinc and/or cadmium and/or barium stearates, ethyl hexoates, ricinoleates, and the like, and other carboxylic acids having from 8 to 18 carbon atoms; stabilizer assistants such as alkyl and aryl phosphites, epoxy compounds, etc.; these and similar materials which may be chosen being dispersed in the vinyl chloride polymer by suitable mixing at an elevated temperature and being effective to stabilize more or less against degradation resulting from aging or exposure to heat or light.

It has now been discovered in accordance with the present invention that improved clarity, usually accompanied by stability above that resulting from use of the metal stabilizers alone can be obtained by the use therein of titanium organic compounds of the form

where W and X are selected from the class consisting of radicals of the form RO where R is selected from the class consisting of alkyl radicals having from 3 to 18 carbon atoms and hydroxyl and amine substitution products thereof, and Y and Z are selected from the class consisting of radicals of the form R'O where R' is selected from the class consisting of alkyl radicals having from 1 to 18 carbon atoms and hydroxyl and amine substitution products thereof, hydroxyl, and radicals of the form R''CO₂, where R'' is selected from the class consisting of alkyl radicals having from 1 to 18 carbon atoms and hydroxyl and amine substitution products thereof.

More restricted groups of additives according to the invention are monomers and polymers of the following formulae:

(1)

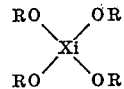

which for convenience may be written $R_4O_4Ti$, where R represents an alkyl group having from 3 to 18 carbon atoms, the four such alkyl groups being not necessarily the same.

(2)

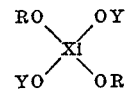

which for convenience may be written $R_2O_2Y_2O_2Ti$, R being chosen from the groups A, B and C and Y being chosen from the groups B and C, group A being an alkyl group having from 3 to 18 carbon atoms, group B being a group of the formula $(CH_2)_nOH$, where $n$ is an integer from 4 to 18, and group C being a group of the formula $(CH_2)_nN<$ where $n$ is an integer from 1 to 3 and the free valency bonds are satisfied with groups selected from the class consisting of hydrogen and alkyl groups having from 1 to 3 carbon atoms. These are chelated compounds.

(3)

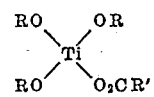

which for convenience may be written $R_3O_3TiO_2CR'$, where R represents hydrogen or an alkyl radical having from 1 to 18 carbon atoms and $O_2CR'$ represents a fatty acid radical having from 8 to 18 carbon atoms. From 1 to 3 R's represent alkyl radicals, the remaining R's representing hydrogen. It is to be understood that the monomers and polymers of the indicated compounds are within the scope of the invention.

The polymer may be written:

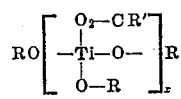

In this formula R and R' have the above indicated significance, $x$ being an integer not less than 1 and the molecular weight being not more than 40,000. Specific examples of such compounds are found in the table below wherein specific compositions of stabilized plastics according to the invention are set forth.

By the term "vinyl chloride resin" is understood not only the vinyl chloride polymer itself but also copolymers of vinyl chloride with vinyl acetate, vinylidine chloride, styrene, and the like wherein vinyl chloride constitutes the major portion of the resin exclusive of plasticizer (if any), stabilizer, and pigment and filler components, if any. The novel auxiliary stabilizers or anti-clouding agents or clarity producing means are used in combination with metallic compounds such as zinc, tin, barium or cadmium organic compounds, suitably mixtures of barium and cadmium compounds such as the ethyl hexoates, stearates, or the like, with or without epoxy compounds, and may be used in connection with organic phosphites and other known anti-clouding agents.

In preparing the novel compositions according to one present specific practice of the invention, the vinyl resin, plasticizer, metal soap type of stabilizer or stabilizers, the auxiliary stabilizer or clarity producing additive according to the present invention and any pigments or diluents such as inert fillers are throughly premixed. The mixture may then be transferred to a roll mill where it is further mixed to the desired extent after which it may be formed into any desired shape in accordance with customary practice.

In order to test the product under conditions more severe than are normally encountered in practice, samples thereof were heated to a temperature higher than the temperature normally employed in manufacture of articles of commerce and for times longer than ordinarily experienced. The examples below were tested at 175° C. which is rather critical temperature for this type of compound in that at a few degrees higher, most of the samples would fail, whereas at several degrees lower, they would mostly show up well.

The manner in which the auxiliary stabilizers perform their function is not fully understood but it is believed that it is by formation of compatible complexes with the metallic chlorides formed by the reaction between hydrogen chloride and the metallic soaps or the like.

The dioctyl phthalate is merely one example of plasticizer and the mixture of barium and cadmium soaps is merely one example of metallic stabilizer suitable for use in the practice of the invention. Other conventional plasticizers and other metal-organic compounds may be used or the plasticizer may be omitted altogether depending upon the intended use. Examples of other plasticizers are: tricresyl phosphate, dibutylsebacate, and the like. Barium, cadmium, zinc, calcium and tin compounds, each may be used alone as the metallic stabilizer, for example barium stearate, barium ethylhexoate, barium ricinoleate and the corresponding cadmium, soaps may be used as well as other barium and cadmium organic compounds, tin, calcium and zinc organic compounds corresponding and the like.

The metal stabilizers such as barium stearate or cadmium ethyl hexoate may be used in proportion up to 10 parts by weight for each hundred parts by weight of vinyl chloride polymer but preferably are used in proportion from 0.1 to 5 parts per 100 parts vinyl chloride polymer, and the auxiliary stabilizer may be utilized in like proportion. From 0.1% to 10.0% by weight total metal stabilizer and from 0.2% to 5% by weight of anti-cloud agent may be considered optimum.

In the case of the examples below, improved clarity, that is, anti-clouding is characteristic. The products are mostly colorless or water-white. In the case of Example 4, the final composition was of a transparent brown color of improved clarity. Tests on these compositions omitting the novel anti-clouding agent or clarity producing means showed definite clouding.

Specific examples are as follows:

|  | 1 | 2 | 3 | 4 | 5 | 6 | 7 | 8 | 9 | 10 | 11 | 12 | 13 |
|---|---|---|---|---|---|---|---|---|---|---|---|---|---|
| Polyvinyl chloride resin | 100 | 100 | 100 | 100 | 100 | 100 | 100 | 100 | 100 | 100 | 100 | 100 | 100 |
| Dioctyl phthalate | 65 | 65 | 65 | 65 | | 65 | 65 | 65 | 65 | 65 | 65 | 65 | 65 |
| Tricresyl phosphate | | | | | 100 | | | | | | | | |
| Cadmium laurate | 0.5 | | | | | | | | | | | | |
| Barium stearate | 1.0 | | 1.0 | 1.0 | 1.0 | | 1.0 | 1.0 | 1.0 | 1.0 | 1.0 | 1.0 | 1.0 |
| Calcium stearate | | 3.0 | | | | | | | | | | | |
| Zinc stearate | | 0.5 | | | | | | | | | | | |
| Cadmium ethylhexoate | | | 1.0 | 1.0 | 1.0 | 0.7 | 1.0 | 1.0 | 1.0 | 1.0 | 1.0 | 1.0 | 1.0 |
| Stannous ethylhexoate | | | | | | 0.5 | | | | | | | |
| Barium laurate | | | | | | 1.0 | | | | | | | |
| Tetra 2-ethylhexyl titanate | 1.0 | 1.0 | 1.0 | | 1.0 | 0.5 | | | | | | | |
| Tetra n-butyl titanate | | | | 1.0 | | | | | | | | | |
| Hydroxy titanium stearate | | | | | | | 1.0 | | | | | | |
| Hydroxy titanium cocoanut acylate | | | | | | | | 1.0 | | | | | |
| Hydroxy titanium castor acylate | | | | | | | | | 1.0 | | | | |
| Triethanolamine titanate-N-linseed acid salt | | | | | | | | | | 1.0 | | | |
| Triethanolamine titanate-N-stearate | | | | | | | | | | | 1.0 | | |
| Triethanolamine titanate | | | | | | | | | | | | 1.0 | |
| Octyleneglycol titanate | | | | | | | | | | | | | 1.0 |

Having thus described the invention, what is claimed is:

A stabilized resin of improved clarity, being a resin of the class consisting of polyvinyl chloride and copolymers of vinyl chloride with monoethylenically unsaturated compounds copolymerizable therewith in which vinyl chloride is the major constituent, said resin being stabilized toward heat by the use of a metallic stabilizer of the class consisting of cadmium, barium, calcium, zinc, and tin salts of saturated aliphatic monobasic carboxylic acids having from 8 to 18 carbon atoms in proportion from 0.1% to 10% based upon the weight of resin and cooperating means incorporated in said resin for producing improved clarity, said means being a chelated titanium compound selected from the group consisting of triethanolamine titanate and octylene glycol titanate and being incorporated therein in proportions from 0.2% to 10% based upon the weight of the resin.

References Cited in the file of this patent

UNITED STATES PATENTS

| 2,307,075 | Quattlebaum et al. | Jan. 5, 1943 |
| 2,453,520 | Langhammerer | Nov. 9, 1948 |
| 2,615,860 | Burgess | Oct. 28, 1952 |

OTHER REFERENCES

"Du Pont Titanium Organics," Titanium Chelates, Pigments Dept., E. I. du Pont de Nemours & Co., 3 pages received in Sci. Libr. Nov. 23, 1953.

UNITED STATES PATENT OFFICE
CERTIFICATE OF CORRECTION

Patent No. 2,933,465                  April 19, 1960

Harold M. Olson

It is hereby certified that error appears in the printed specification of the above numbered patent requiring correction and that the said Letters Patent should read as corrected below..

Column 2, lines 3 to 6, the formula should appear as shown below instead of as in the patent:

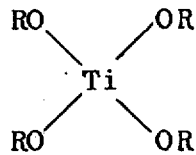

lines 11 to 14, the formula should appear as shown below instead of as in the patent:

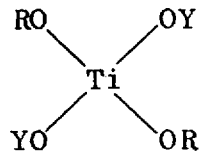

same column 2, line 70, for "throughly" read -- thoroughly --; columns 5 and 6, headed by the patent number 2,934,465, were inadvertently included as part of Letters Patent No. 2,933,465, only, and should be deleted.

Signed and sealed this 4th day of October 1960.

(SEAL)
Attest:

KARL H. AXLINE                           ROBERT C. WATSON
Attesting Officer                     Commissioner of Patents